(12) United States Patent
Miller et al.

(10) Patent No.: US 7,209,876 B2
(45) Date of Patent: Apr. 24, 2007

(54) SYSTEM AND METHOD FOR AUTOMATED ANSWERING OF NATURAL LANGUAGE QUESTIONS AND QUERIES

(75) Inventors: Michael J. Miller, Germantown, MD (US); Leonard Jay Wantz, Taneytown, MD (US)

(73) Assignee: Groove Unlimited, LLC, Taneytown, MD (US)

( * ) Notice: Subject to any disclaimer, the term of this patent is extended or adjusted under 35 U.S.C. 154(b) by 803 days.

(21) Appl. No.: 10/293,743

(22) Filed: Nov. 13, 2002

(65) Prior Publication Data

US 2003/0093276 A1 May 15, 2003

Related U.S. Application Data

(60) Provisional application No. 60/337,771, filed on Nov. 13, 2001.

(51) Int. Cl.
*G10L 15/00* (2006.01)
(52) U.S. Cl. .............................. 704/9; 707/4
(58) Field of Classification Search ................ 704/9; 707/4
See application file for complete search history.

(56) References Cited

U.S. PATENT DOCUMENTS

| | | | |
|---|---|---|---|
| 4,688,195 A * | 8/1987 | Thompson et al. | 706/11 |
| 5,309,359 A | 5/1994 | Katz et al. | 364/419.19 |
| 5,386,556 A * | 1/1995 | Hedin et al. | 707/4 |
| 5,404,295 A | 4/1995 | Katz et al. | 364/419.19 |
| 5,418,948 A | 5/1995 | Turtle | 395/600 |
| 5,499,335 A | 3/1996 | Silver et al. | 395/161 |
| 5,592,668 A | 1/1997 | Harding et al. | 395/602 |
| 5,734,889 A | 3/1998 | Yamaguchi | 395/604 |
| 5,768,603 A | 6/1998 | Brown et al. | 395/759 |
| 5,873,076 A | 2/1999 | Barr et al. | 707/3 |
| 5,884,302 A | 3/1999 | Ho | 707/3 |
| 5,963,940 A * | 10/1999 | Liddy et al. | 707/5 |
| 5,991,713 A | 11/1999 | Unger et al. | 704/9 |
| 6,026,388 A | 2/2000 | Liddy et al. | 707/1 |
| 6,052,656 A | 4/2000 | Suda et al. | 704/9 |
| 6,078,914 A | 6/2000 | Redfern | 707/3 |
| 6,081,774 A | 6/2000 | de Hita et al. | 704/9 |
| 6,088,692 A | 7/2000 | Driscoll | 707/5 |
| 6,126,306 A | 10/2000 | Ando | 364/419.02 |
| 6,192,338 B1 | 2/2001 | Haszto et al. | 704/257 |
| 6,282,538 B1 | 8/2001 | Woods | 707/5 |
| 6,314,411 B1 | 11/2001 | Armstrong | 706/11 |
| 6,327,589 B1 | 12/2001 | Blewett et al. | 707/5 |
| 6,418,432 B1 | 7/2002 | Cohen et al. | 707/5 |
| 6,950,793 B2 * | 9/2005 | Ross et al. | 704/9 |

* cited by examiner

*Primary Examiner*—Daniel Abebe
(74) *Attorney, Agent, or Firm*—Whiteford Taylor & Preston L.L.P.

(57) ABSTRACT

A method for searching an information repository to find answers to natural language questions by generating an expected answer form based upon the form of the natural language question or query, searching for an answer meeting the specification of the expected answer form, and rendering an answer to a user.

32 Claims, 5 Drawing Sheets

| NLQ | GQF | Bindings | EAF |
|---|---|---|---|
| How many inches are in a foot? | How many x+ are in (a\|an) y+ | x+= inches; y+= foot | There are z+ inches in a foot |
| How many square feet are in an acre? | | x+=square feet; y+= acre | There are z+ square feet in an acre |
| How many large hard shell crabs are in an average bushel? | | x+= large hard shell crabs; y+= average bushel | There are z+ large hard shell crabs in an average bushel |
| How do search engines work? | How (do\|does) x+ verb | x+= search engines; verb = work | Search engines work by z+ |
| What is the definition of pi? | What is the definition of x+ | x+= pi | The definition of pi is z+ |
| What does allocate mean? | | x+= allocate | The definition of allocate is z+ |
| What is the meaning of the phrase "regular expression?" | | x+= regular expression | The definition of regular expression is z+ |
| What is the definition of pi? | What is (a\|an\|the) x+ | x+= definition of pi | The definition of pi is z+ |
| Wha is the meaning of life? | | x+=meaning of life | The meaning of life is z+ |
| What is the best way to get from Philadelphia to Pittsburgh? | | x+= best way to get from Philadelphia to Pittsburgh | The best way to get from Philadelphia to Pittsburgh is z+ |
| What is a homunculus? | | x+= homunculus | A homunculus is z+ |
| Why is the sky blue? | Why (is\|do) np + adj | np+= the sky; adj= blue | The sky is blue because z+ |

SYSTEM AND METHOD FOR AUTOMATED ANSWERING OF NATURAL LANGUAGE QUESTIONS AND QUERIES

CROSS-REFERENCE TO RELATED APPLICATIONS

The present application is based upon and gains priority from U.S. Provisional Patent Application Ser. No. 60/337,771, filed Nov. 13, 2001 by the inventors herein and entitled "System and Method for Automated Answering of Natural Language Queries," the specification of which is incorporated herein by reference.

BACKGROUND OF THE INVENTION

1. Field of the Invention

The invention disclosed herein relates generally to the retrieval of information from electronic repositories of information, and more particularly to a system and method for accepting natural language questions and queries, searching electronic repositories of information for answers to such natural language questions and queries which syntactically correspond to a generic form of the natural language question or query, and providing answers to a user in a form that is directly responsive to the query.

2. Description of the Background

Tremendous volumes of information are electronically accessible to users at remote, diverse locations across the globe. Whether through the World Wide Web, virtual private networks, or any other medium enabling remote access to a collection of electronic information, users today have access to a wealth of information, often stored in computer databases or other electronic collections. In order to fully leverage the usefulness of such information, it is advantageous to enable those who access such electronic collections of information to issue particularized search queries so that they may extract from such collections the precise information they are seeking. However, the sheer enormity, heterogeneity and dynamism of, for example, the World Wide Web, can make it difficult to find truly responsive answers to a user's search queries. Search engines have been provided in the past to enable a user to search for key words or key phrases, at times linked by Boolean operators, to hone in on those answers that are most responsive to the user's intended query. However, effective searching using key words, key phrases, and Boolean operators often requires specialized knowledge on the part of the user enabling them to structure the query in a form that is best adapted to retrieve the intended information. Such Boolean search logic rarely mirrors a user's natural language, making use of such search engines difficult, and at a minimum requires a level of specialized knowledge and sophistication of the user in order to generate useful, relevant results.

Moreover, even for those users who have a solid understanding of the formulation of search queries, often times a well-reasoned search query will either be drawn too broadly—such that it generates a large number of responses which are entirely irrelevant to the issue being investigated—or is drawn too narrowly—such that potentially relevant responses are missed altogether. This often causes a user to proceed through a time-consuming trial and error process to formulate the optimal search query.

Efforts have been made in the past to provide natural language interfaces to reduce the burden on users in finding relevant information in the vast volumes of information available in electronic form. Such natural language interfaces prompt a user to input a question in a natural language format, and purport to translate such natural language questions and queries into effective (non-natural language) queries usable by a search engine to extract information that is responsive to the user's natural language question or query. For example, ALTA VISTA, a popular World Wide Web search engine, for a time suggested that users pose natural language questions to its search software. However, as understood by the inventors herein, such processing simply extracted key words and/or phrases from the user's natural language question or query, and submitted those key words to a traditional search engine. The results to the user's natural language question or query thus were almost never a direct answer to the user's particular question.

Another example of prior attempts to ease the burden on less sophisticated searchers of electronic collections of information includes ASK JEEVES, another popular search engine which allows a user to search a database that was generated by the ASK JEEVES service. Pursuant to the ASK JEEVES service and as understood by the inventors herein, researchers use traditional search techniques to research particular topics and assemble electronic databases containing information relating to those topics. If a user happens to be searching for information in one of the topics that was previously searched, they can obtain valid results with responsive answers to their queries. If, however, a user is searching for information that has not been previously researched (and thus a database entry has not been generated for such topic), then such service can do nothing more than initiate the traditional key word search, which in turn will yield results of highly variable relevance.

Given the difficulty associated with formulating accurate search queries, there exists a need for an improved system and method for retrieving information from electronic repositories of information, and in particular for a system and method enabling users to retrieve relevant results to their search queries, even when the users lack specialized knowledge concerning how to formulate a proper query. Preferably, the user should be expected to input no more than a natural language question or query, and the system should be expected to respond with a correct answer, or collection of answers, whether or not the system has ever before been faced with that question. Moreover, the output presented by the system should provide a direct answer to the user's query, without requiring the user to filter through irrelevant documents happening to include words included in the query, but having nothing at all to do with the subject of the query.

SUMMARY OF THE INVENTION

The present invention provides a system and method enabling users to retrieve relevant results to a natural language question or query, even in those cases in which the user lacks specialized knowledge concerning how to formulate a proper query. The system and method disclosed herein in varying embodiments include using a heuristic for accepting natural language questions or queries, transforming the natural language question or query into a generalized natural language answer form (i.e., the natural language structure that an answer to the user's query is expected to take), using an answer form as a pattern-matching template against which the data collection may be searched, and providing natural language answers having a form matching the natural language answer form. Thus, the method described herein can be described as a transformational, or morphological, search, and provides a new and useful technique for searching large repositories of information, including electronically stored information.

The methods described herein thus include analysis of the form of a query in order to determine the form of answer that should be sought. For example, when asked to answer the question "How many red balloons is Mary holding?", many persons would answer with the phrase "Mary is holding," then state the number of red balloons, and then finish the answer with the phrase "red balloons," as in "Mary is holding four red balloons." Similarly, to find this answer in a book or story about Mary, a reader could look for a sentence of the form "Mary is holding x red balloons." The phrase that appears in place of "x" in the sentence found in the story is the substantive answer to the question. The system and method described herein thus employ this principle to provide an automated process for transforming the subject query into a generic answer form, which generic answer form is then sought in the information repository to provide the correct substantive answer to the user's question in a form that the user expects to receive such answer.

Thus, after a user inputs a natural language question or query, the system and method described herein may proceed with a grammatical transformation process, an answer phrase meta-search process, and a content transformation process. During the grammatical transformation process, the method and system grammatically transform an initial question into one or more expected answer forms, i.e., a syntactic form that an expected answer to the user's question will take. The expected answer forms provide a skeletal foundation for answers to the question. Once the expected answer forms have been generated, phrases present in the expected answer form are used as input to generate a new search query that can be processed by a traditional search engine, e.g., ALTA VISTA, GOOGLE, or INFOSEEK, to search the repository of electronic information. The results of the key words and phrases search are then subjected to a meta-search to identify those results that match the expected answer form. The resulting "answer phrases" of the meta-search are then initially transformed into a form that is suitable for the user to view, including for example removing or consolidating redundant answers and ranking the results. Likewise, the answer to the posed question may be highlighted and provide a hyperlink to the originating document or to other information. Further, additional context may be provided in the answer that may help to explain the answer, which context may comprise additional extracted text from the originating document. Still further, automated classification tools may be implemented to, for example, sort the answers by subject matter.

After that initial transformation, the answers can be further transformed into markup language appropriate for the user interface, such as (by way of example only) HTML, WML, HDML, or c-HTML.

The transformation search method described herein can be used in a number of ways, two of which are demonstrated herein by building reference implementations. Each is a Web-based meta-search engine. One system provides a computer-based user interface that presents a user with a text entry field in which to pose a natural language question in any domain. The system then employs the above-described method and transforms the user's question into an expected answer form, generates a query which in turn is submitted to one or more traditional search engines or other information retrieval engines, initiates a meta-search on the results of the traditional search to find answer phrases, evaluates answer phrases, ranks answer phrases, and displays to the user the resulting listing of answer phrases. In the context of the World Wide Web, the universal resource locator (URL) or other document identifier containing each answer may be provided for further reference.

Another system provides a computer-based user interface that prompts the user to directly input the expected answer form as a "fill in the blank" query instead of a natural language question. After the user has input the expected answer form, the system employs the remainder of the methods outlined above, including generating a key words and phrases query to provide input to a traditional search engine, initiating a meta-search on the results of the traditional search to find answer phrases, and evaluating, ranking, and displaying the resulting list of answer phrases to the user.

While the above examples particularly depict Web-based implementations, it is also possible to employ the method described herein to search other data repositories, for example, a library of "e-books."

The system and method described herein are designed to provide as output answers to the original query. Thus, while traditional search engines ordinarily provide results in the form of links which the user must browse through in order to retrieve the desired data, the system and method described herein actually go a step further and provide the ultimate answer to the question, without requiring further investigation of the source document which generated that answer. Also, while prior electronic information search tools have attempted to enable natural language question or query searching or other enhanced search features, such tools often require the initial establishment of a knowledge base that is manually generated from the broader repository of available information. The system and method described herein provide improved search capabilities without the manual establishment of a separate knowledge base, instead proceeding with each search to query the entire library of electronic information that is to be searched, and after conducting such a search of the entire library, modifying those results to place them in the form of a properly formatted answer to the original query. Thus, the system and method described herein provide for enhanced search capability accomplished through real time searching of the information source, as opposed to searching a library that has been derived from the information source.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 2 is a representative table of exemplary answer forms, along with their bindings with respect to particular natural language questions.

DETAILED DESCRIPTION OF THE PREFERRED EMBODIMENTS

Figure 1:
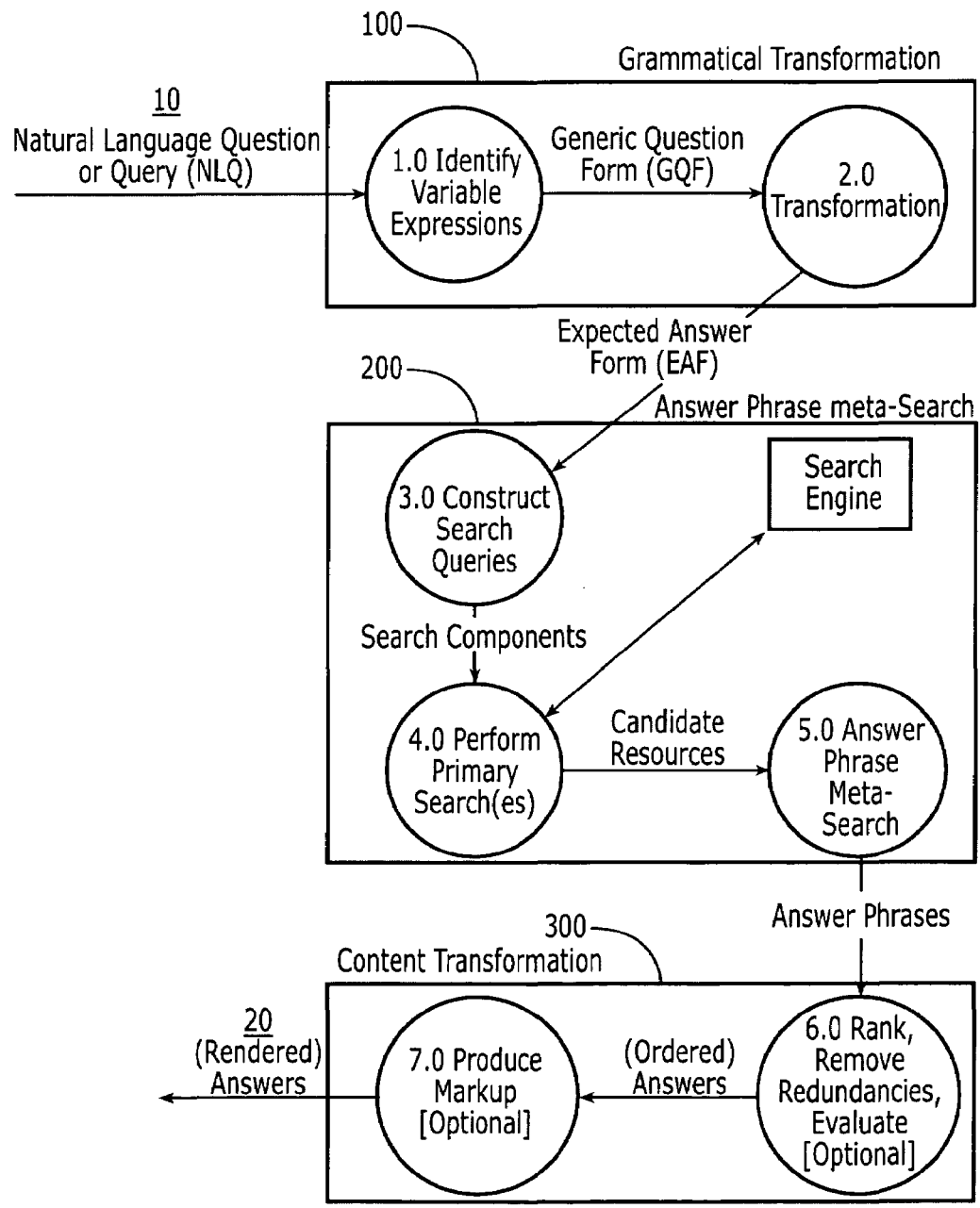
FIG. 1 is a schematic view of the overall method employed by a preferred embodiment of the instant invention.

A system and method described with reference to a first preferred embodiment according to the invention employ a grammatical transformation search structure in which a natural language question is transformed into a generic query format. The generic query format is then used as a standardized notation of the original query, and is preferably structured to enable phrases or "substrings" within the generic query to be represented by variables. In this way, a generic query form may be established from the original query, including variables that are representative of the specific pieces of information that are to be sought in the information repository. Based on that generic query form, a matching answer form may be sought that relates to that specific generic query form. By initially converting the original question into such a generic query form, the appropriate answer form or forms may be identified, thus reducing the variability in results that will naturally occur from disparate users generating disparate queries to search for the same concept or piece of information.

Both the generic query forms and answer forms may be expressed as natural language expressions or phrases interspersed with one of a number of different formal notations enabling operations by the processes described herein. First, a simple variable scheme may be used to represent the specific item of data that is to be sought in the information repository. For example, "there are x inches in a foot" may be used to represent the natural language phrase "there are twelve inches in a foot." Likewise, "there are blank1 blank2 inches in a foot" may be used to represent the natural language phrase "there are exactly twelve inches in a foot." In this case, each unique variable (e.g., x, blank1 and blank2) stands for a single word. The phrase "there are twelve inches in a foot" is represented by, or matches, the form "there are x inches in a foot" from the first example, because substituting the word "twelve" for the variable x creates the matching phrase. However, "there are twelve inches in a foot" does not match the second example "there are blank1 blank2 inches in a foot," because there are two variables (blank1 and blank2) in the second example and only one word, namely "twelve," that is otherwise unaccounted for. Conversely, the phrase "there are exactly twelve inches in a foot" matches the phrase "there are blank1 blank2 inches in a foot," but not "there are x inches in a foot."

Second, a regular expression notational scheme may be used to represent the specific item of data that is to be sought in the information repository. For example, "there are word+ inches in a foot" may represent both phrases "there are twelve inches in a foot" and "there are exactly twelve inches in a foot." Here the regular expression is "word+" and it stands for some string (i.e., sequence of words) of one or more words, depending upon the usual semantics for regular expression symbols (e.g., "+" means one or more of the preceding symbol). Both "twelve" and "exactly twelve" match the regular expression "(word)+" in this example. Therefore, both "there are twelve inches in a foot" and "there are exactly twelve inches in a foot" match the variable laden phrase "there are word+ inches in a foot."

Third, a context-free, or fourth, a context-sensitive grammar notational scheme may be used to represent the specific item(s) of data that are to be sought in the information repository. Both of these well-known formalisms use non-terminal symbols to represent other phrases. A non-terminal symbol is expanded into other "non-terminal" and "terminal" symbols following the rules of the given grammar. For example, there might be a rule that sanctions the replacement of the non-terminal symbol <sentence> by a <noun phrase> followed by a <verb phrase>, or one that permits the replacement of the non-terminal symbol <adjective> with an actual adjective. Using this latter rule, "there are <adjective> inches in a foot" can represent the phrase "there are twelve inches in a foot."

While the above-noted notational schemes are presently preferred, it is noted that other schemes including first-order predicate logic grammatical notation schemes could likewise be used without departing from the spirit and scope of the invention herein.

Each of the schemes mentioned above provides a formal way to represent substrings that may appear within an encompassing superstring. In formal terms, a simple variable scheme is less powerful than regular expressions in that the sentences that can be represented with a finite expression containing simple variables are a proper subset of those that can be represented using regular expression. Likewise, regular expressions are less powerful than context-free grammars, and context-free grammars are less powerful than context-sensitive grammars. For exemplary purposes in describing a preferred embodiment of the instant invention herein, the particular scheme that is applied is the one which the inventors herein believe is best suited to the particular example, it being considered within the skill of a person of ordinary skill in the art to select which notational scheme is most appropriate for a given phrase. When referring generically to any of these symbolic annotations in this description—variables, regular expressions, or context-free/sensitive symbols—we use the phrase "variable expression." The association between a variable expression and its natural language phrase is referred to as a "binding." Thus, in one example outlined above with regard to a regular expression variable scheme, it can be said that the phrase "exactly twelve" is a binding for the variable expression "(word)+".

FIG. 1 is a schematic view of the overall method employed by a first preferred embodiment of the invention. As shown in FIG. 1, a Natural Language Question ("NLQ") 10 is received as input, and the goal of the method is to find one or more answers 20 to the NLQ 10 in an information repository, and provide such answers as output. Such information repository is preferably in electronic form, although it can be in any form as long as there is an automatic way to search through it Such information may exist, by way of example only, as a proprietary collection of information stored in one or more databases at a single user's location, information on geographically disparate servers linked on a virtual private network, or entirely independent collections of information stored as computer files linked across a wide area network such as the World Wide Web. The system thus receives as input a natural language question or query 10 and produces one or more natural language answers 20 as output. In between those two steps, the system carries out a number of processes that may be grouped into three primary system functions, namely, (i) a grammatical transformation step 100, (ii) a meta-search step 200 to find answer phrases, and (iii) a content transformation step 300 to transform the answer phrases into answers to the original natural language question or query.

The grammatical transformation step 100 is a software-enabled function that transforms a natural language question or query into one or more expected answer forms (i.e., one or more pattern-matching forms, each providing a skeletal form of potential answers to the natural language question or query). Many questions, in the form of natural language questions, can be grammatically transformed into a set of expected answer forms using a two-stage transformation process. There is generally a one-to-many mapping from a natural language question or query to an expected answer form. In other words, more than one expected answer form may exist for each natural language question or query. To facilitate the transformation of the natural language question or query into one or more expected answer forms, the natural language question or query is first transformed into one or more generic question forms. Each generic question form then, in turn, produces one or more expected answer forms.

Generic question forms are natural language phrases interspersed with variable expressions, and are used by the method and system of this preferred embodiment of the invention as generic representations of a natural language question or query. By way of example, the natural language question "How many inches are in a foot?" is an instance of the generic question form "How many x are in a y." So too is the question "How many cups are in a gallon?" Using regular expression notation as discussed above, these natural language question may be expressed as "how many (w)+ are in ay+?" Likewise, using context-free grammar notation as discussed above, that natural language question may be expressed as "How many <noun phrase> are in a <noun phrase>?" Similarly, the natural language question "Where is Taneytown located?" may be expressed by the generic question form "Where is z located?"

Notably, there may be many different generic question forms for any given natural language question or query. Moreover, it is not a requirement that the generic question form be a syntactic-only transformation. Semantic and other transformations may also be used. For example, "Where is Taneytown located?" may be expressed by the generic question form "Where can the city of x be found?" Thus, varying forms of generic question forms for a given class of natural language questions or queries can provide varying results. This can result in differences propagated through the entire method described herein to ultimately provide different answers 20, some of which may be more useful than others.

Like the generic question forms, expected answer forms are also natural language phrases interspersed with variable expressions. An expected answer form is a skeletal structure providing a generic form that answers to the natural language question or query are expected to take. For instance, the natural language question "How many inches are in a foot?" will have as one of its expected answer forms "There are x inches in a foot." Finding a correct natural language phrase to substitute for, or bind to, x is akin to answering the original query. In the sentence "There are twelve inches in a foot," "twelve" binds to x and is the substance of an answer to the natural language question. In order to generate the expected answer forms for a given generic question form, the method and system of the present embodiment of the invention compares the format of the generic question form against a stored collection of generic question forms, each of which has one or more pre-bound expected answer forms associated with it. A "pre-bound" expected answer form is simply an expected answer form in which variables are present which correspond to the substantive data in the original natural language question or query. For instance, given a natural language question "How many inches are in a foot?" a generic question form may be established of the form "How many x are in a y?" resulting in a pre-bound expected answer form of the form "There are z x in a y." As noted in this example, the natural language question thus comprises both generic question terms, i.e., "how many" and "are in a", and substantive date terms, i.e., "inches" and "foot." The pre-bound expected answer form thus includes variable phrases "x" and "y" linked to the substantive data terms in the natural language question, and are referred to herein as "substantive data variable phrases." Likewise, the pre-bound expected answer form also includes the variable phrase "z" representing the data that is sought as an answer to the query, which variable phrase is referred to herein as an "answer variable phrase." After one or more specific pre-bound expected answer forms are generated, the substantive data variable phrases are replaced with the substantive data from the original natural language question or query. This is accomplished through the use of bindings between the substantive data in the natural language question or query and the substantive data variable phrases in the generic question form, which variable expressions are carried through to the pre-bound expected answer forms. After such binding of x and y to their respective phrases from the natural language question or query, the pre-bound expected answer form is replaced with a completed expected answer form. Relating to the example set forth above, the expected answer form would thus take the form "There are z inches in a foot," which completed expected answer phrase maintains the answer variable phrase. In this manner, we may expect that an answer to the natural language question "How many inches are in a foot?" will be of the form "There are x inches in a foot."

By way of example only, an exemplary instruction performed by the software-implemented method described herein to generate an expected answer form may be carried out pursuant to the following instruction:

IF a generic_question_form of the NLQ is "how many x+ are in a y+"

THEN answer_form_1:=concat("there are z+", binding (x+), "in a", binding (y+))

//concat is the concatenation function; binding (x+) returns the string bound to the expression x+

Thus, again by way of example only, the natural language question "How many inches are in a foot?" would be processed by the method and system of this preferred embodiment of the invention to produce the expected answer form "there are z+ inches in a foot." Likewise, but using a different generic question form, the natural language question "Why is the sky blue?" would be processed to produce the expected answer form "the sky is blue because z+". FIG. 2 provides a representative table of additional exemplary answer forms, along with their bindings with respect to particular natural language questions. Note, however, that such generic question forms, bindings, and expected answer forms are exemplary only, that additional generic question forms, bindings, and expected answer forms may exist for each of the depicted natural language questions, and that an endless variety of other natural language questions and queries may be subjected to the grammatical transformation step 100 discussed herein to provide an expected answer form. The particular format of the generic question form that may be associated with a given natural language question or query may be readily modified as necessary for a given application, as may expected answer forms that correspond to such generic question forms, without departing from the spirit and scope of the invention described herein. While highly complex natural language questions and queries may require complex transformations (i.e., complex generic question forms and expected answer forms), it is of note that given a large and varied information repository, such as the World Wide Web, much of that complexity may be eliminated. More particularly, if for example the information repository is expected to contain the phrase "there are 12 inches in a foot," then it may be sufficient to look for this precise form as an answer, and to not spend time looking for alternative forms, such as "a foot contains 12 inches."

Also, while the above-described method of generating an expected answer form from a generic question form refers to comparing the generic question form to a listing of several generic question forms, a more dynamic approach may also be utilized of parsing the generic question form directly into an expected answer form, if desired.

After the expected answer forms are established, meta-search step 200 searches for phrases in an information repository, such as the World Wide Web, that match the form of the generated expected answer forms. Meta-search step 200 is a software-enabled function that receives the expected answer forms from grammatical transformation step 100, searches the information repository to obtain potentially responsive content, and searches and filters the potentially responsive content to identify answer phrases (i.e., natural language phrases that match the expected answer forms and that may provide an answer to the original natural language question or query). Such answer phrases are candidates to contain actual answers to the original natural language question or query.

During meta-search step 200, the expected answer form provides data that is of use in a search for answers. In the method and system of the invention, first a traditional keyword/phrase style search (using an existing Web search engine) is undertaken for data that contains keywords and phrases present in the expected answer form. Preferably, in order to initiate such a keyword/phrase style search, the regular expressions are removed from the expected answer form, and the remaining keywords and phrases are submitted to a search engine via a simple HTTP request, as is known in the art. Once the initial information has been returned from the traditional keyword search, a meta-search is performed on the resultant data set to look for "answer phrases." An "answer phrase" is a potential answer to the query upon which the expected answer form was based. It is a natural language phrase that contains bindings for each of the answer variable expressions in the completed expected answer form. For example, in the statement "there are exactly 12 inches in a foot," "exactly 12" binds to x+ from the expected answer form "there are x+ inches in a foot." Similarly, in the statement "there are twelve inches in a foot," the word "twelve" binds to x+. Thus, both "there are exactly 12 inches in a foot" and "there are twelve inches in a foot" are answer phrases for the expected answer form "there are x inches in a foot."

To accomplish the meta-search, any sufficiently powerful algorithm for string-based pattern matching will do. The algorithm employed should account for such things as punctuation and upper-lower case differentiation, as well as for any parsing, substitution and pattern matching requirements of the underlying theory of the notation used. If regular expressions are used, the pattern matcher should accommodate full regular expression pattern matching; likewise for simple variables and context free grammars. Such algorithms for string-based pattern matching are readily commercially available and known in the art. An exemplary algorithm for use in the system and method described herein is embodied in AWK, a utility that enables a programmer to write programs in the form of statements that define text patterns that are to be searched for in each line of a document, and the action that is to be taken when a match is found within a line. AWK comes with most UNIX-based operating systems such as Linux.

While not every candidate information source contains the exact answer phrase that is being sought, it is believed that many information repositories having a wide variety of information, such as the World Wide Web, will provide answer phrases for specific generic question forms, simply due to the enormity and heterogeneity of the available information.

It is not necessary for an expected answer form, an answer phrase, or an answer to be in the form of complete sentences, or even grammatically correct phrases. Also, there is no guarantee that a particular answer phrase supplies a correct answer to a question. For instance, it is possible that an author has placed information on a page accessible via the World Wide Web that contains the phrase "there are 11 inches in a foot," and this might constitute an answer phrase to an inches-in-a-foot query. However, for large repositories of information, one may presume that many more authors will have placed the correct information in the repository, namely in this instance that there are 12 inches in a foot. Other evaluative and reasoning mechanisms can be employed to make a determination regarding the correctness of an answer vis-à-vis the original query. These mechanisms can be automated to a greater or lesser extent depending upon the nature of the data found in the data repository.

The final step depicted in FIG. 1, content transformation step 300, is a software-enabled function that receives the answer phrases from the meta-search step 200 and transforms the content into whatever format is required to enable the rendered answers 20 to be viewed. Once the answer phrases are determined, any redundant answers are removed or consolidated. Other types of post processing may also be performed by this component, such as ranking results. For example, one may rank the most concise (terse) answers higher than those that are more verbose. Likewise, one may rank those that have redundant answers higher than those that do not. Any number of heuristics could be used by this component to perform ranking. For example, answers may obtain a higher ranking that match a syntactic transformation over those that require semantic transformation. If the question is "Where is Taneytown located?" an answer of "Taneytown is located in Carroll County" may be preferred heuristically over an answer of "Taneytown can be found in Carroll County." Also, other information about the resource may play a role. For instance, the date of the last update of the resource may be used in ranking, or the publisher of the resource may receive a particular ranking.

After the redundant answers have been removed or consolidated, the content is transformed in appropriate form to be rendered to the user. In the case of a standard Internet Web browser, for instance, the content can be transformed into HTML. In the case of a WAP-based browser, the content may just as easily be transformed into WML or HDML.

Figure 3:
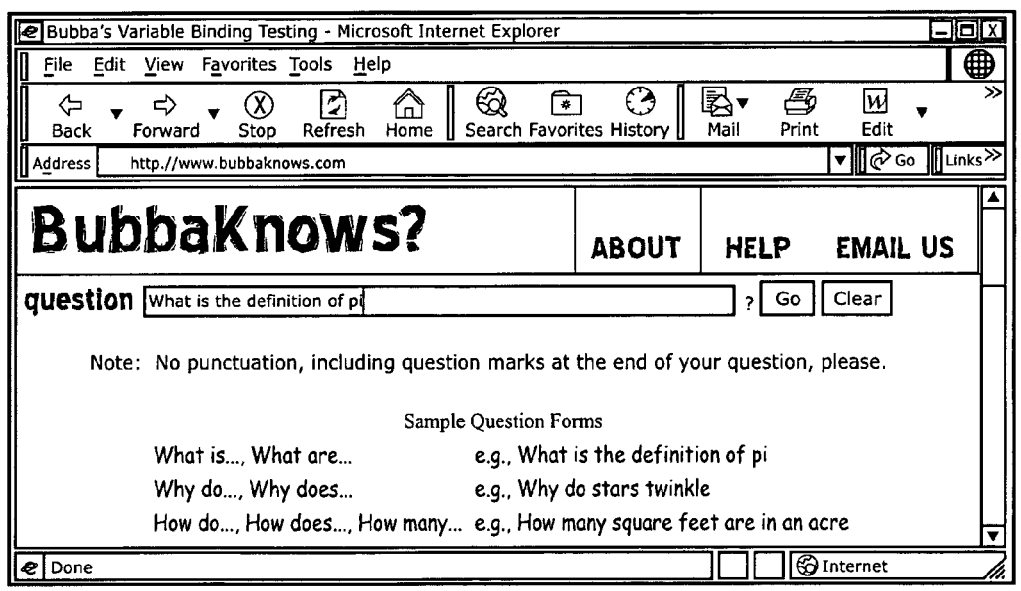
FIG. 3 is a schematic view of an embodiment of a user-accessible web page capable of employing a method according to a first embodiment of the invention.

The technical method of the transformational search of the instant invention is preferably implemented through a user-accessible Web page. In a first embodiment (shown in FIG. 3), the Web page provides a question answering service, where the user is presented with a text entry field in which to pose a natural language question of unlimited domain. An example question is "What is the definition of pi?" An example answer found to that question might be "The definition of pi is remarkably simple. It is the ratio between the circumference and diameter of a circle. To a few decimal places its value is 3.14159365."

This first embodiment contains a fully automated software engine operating on, for example, a remotely accessible computer server, which software engine is designed to answer natural language questions through the use of transformational search as described above. In this implementation, answers are sought from a subset of information obtained from an electronic data repository, such as the World Wide Web, which subset of information is obtained through meta-search techniques as discussed at length above. First, the system prompts a user to input a natural language question. The system then processes the user's natural language question using grammatical transformation to create expected answer forms. Queries are then derived from the expected answer forms, and are submitted to several keyword-based search engines (e.g., ALTAVISTA or INFOSEEK), producing the input for the answer phrase meta-search. Potential answers are found, evaluated, ranked and displayed to the user directly on a results page. Answer phrases are presented in a ranked order with the actual bindings highlighted for readability. The URL of the document containing the answer is provided for further reference, if needed.

Figure 4:
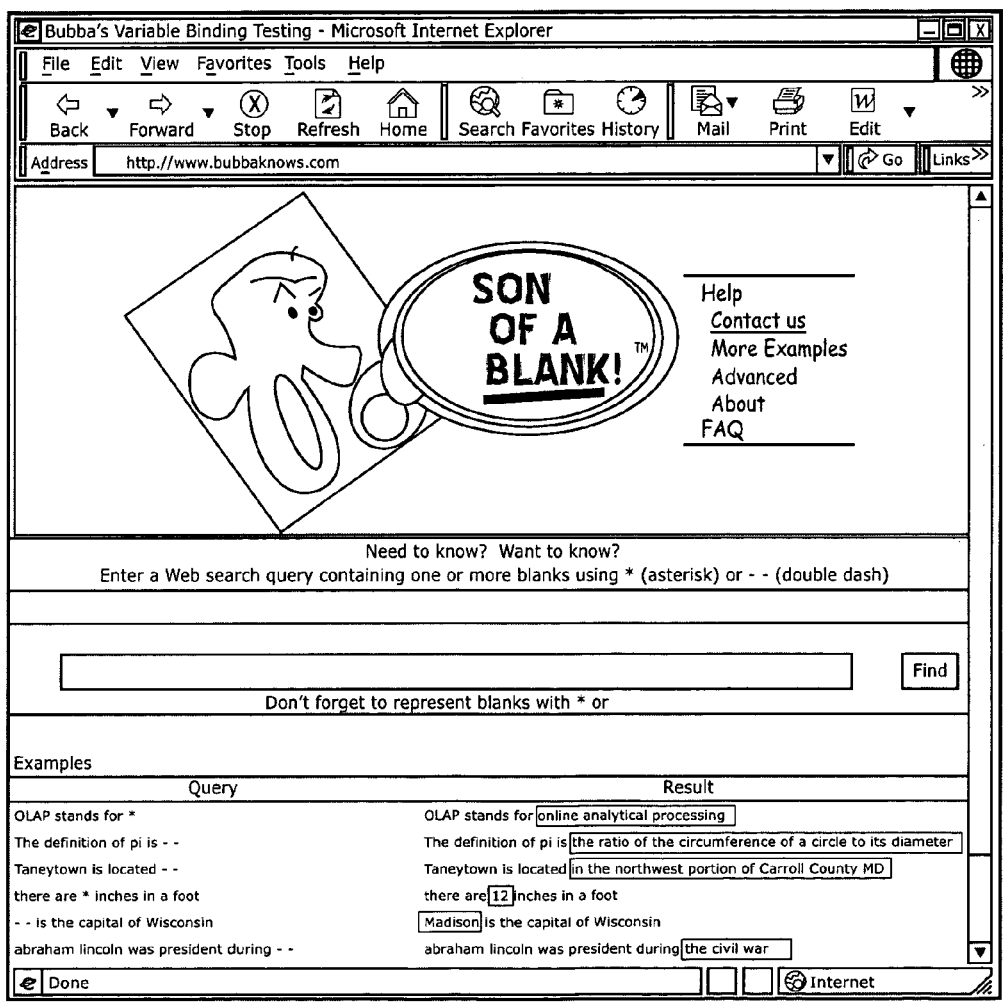
FIG. 4 is a schematic view of an embodiment of a user-accessible web page capable of employing a method according to a second embodiment of the invention.

In a second embodiment (shown in FIG. 4), an alternative form of query answering service is provided via a fully automated software engine operating on, for example, a remotely accessible computer server. In this case, the system prompts the user to input an expected answer form and not the natural language question. This is conceptually similar to creating a "fill in the blank" form. An example is "The definition of pi is _____," or "There are _____ inches in a foot." The blanks in these examples operate like simple variables, and are more clearly represented with the expected answer form notation s: "The definition of pi is (word+)," and "There are x inches in a foot." This second embodiment allows the user to pose queries using all of the notation schemes that are described above. Therefore, more complex queries can be posed, such as "Jeb Bush is (words1)+ of (words2)+." This query can result in many answers, including "Jeb Bush is the brother of George W. Bush" and "Jeb Bush is the Governor of Florida."

This second embodiment is implemented using the same meta-search techniques as set forth above with regard to the first embodiment, in order to operate over a representative subset of the information repository. However, during the application of the transformational method, the steps that create a generic question form and then an expected answer form are skipped, because the expected answer form is already posed via the user input.

Figure 5:
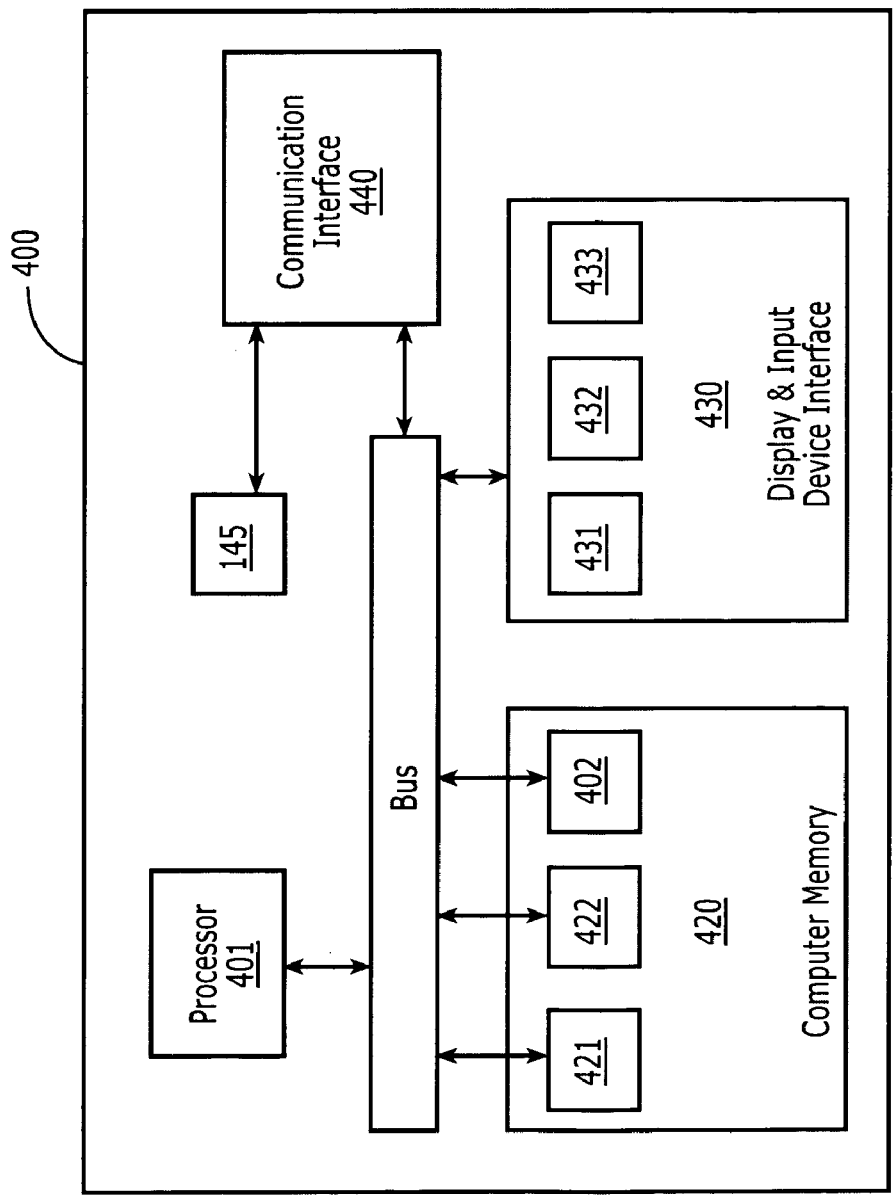
FIG. 5 is a schematic view of a computer system according to a preferred embodiment of the invention.

A preferred embodiment of a system capable of implementing the above-described method is shown in the schematic view of FIG. 5, in which a remote server 400 is provided which administers the transformational search functions discussed above. Remote server 400 preferably comprises a bus 410 or other internal communications mechanism enabling communication between elements of server 400, and processor 401 coupled with bus 410 for processing information. Server 400 preferably includes computer memory 420 including main memory 421, read only memory ("ROM") 422, and storage device 402. Main memory 421 may comprise random access memory ("RAM") or any other similarly configured dynamic storage device, and is coupled to bus 410 for storing information and instructions that are to be executed by processor 401, as well as temporary variables or other intermediate information during execution of instructions to be executed by processor 401. ROM 422 is likewise coupled to bus 410 for storing static information and instructions for processor 401. Finally, storage device 402, in the form of a magnetic disk, optical disk, or similarly configured electronic information storage device, is coupled to bus 410 for storing information and instructions. It will be recognized by those skilled in the art that a library of expected answer forms corresponding to generic question forms, as well as any other data collected or accessed by server 400, may be stored on server 400 in storage device 402, or may be stored in a separate computer (not shown) that is in remote communication with server 400.

Bus 410 also provides communication with a display and input device interface 430, which interface preferably comprises a connection mechanism for a display device 431, such as a cathode ray tube or similarly configured visual display device, a connection mechanism for a first input device such as a keyboard 432, and a connection mechanism for a second input device such as computer mouse 433, which input devices communicate information and command selections to processor 401.

Bus 410 also provides communication with a communication interface 440 which provides two-way data communication coupling to a network link 445, which link in turn provides connection to other data devices, such as to a host computer or data equipment operated by an Internet Service Provider ("ISP"), which ISP in turn provides data communication services to an external network such as the World Wide Web. Communication interface 440 may comprise, by way of example, an integrated services digital network ("ISDN") card, a modem, a local area network ("LAN") card, or a wireless communication interface.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for producing answers to a question or query issued to an information repository containing natural language data, executable in a computer system, comprising the steps of:
   a. receiving a search question or query containing at least one variable expression, said at least one variable expression being representative of desired answer data that is to be searched for in said information repository;
   b. initiating a search of said information repository for information containing terms present in said search question or query and receiving a first data set comprising information containing terms present in said search question or query;
   c. searching said first data set for answer phrases present in syntactically similar form to said search question or query and containing answer data which may replace said variable expression to provide an answer to said search question or query, and retrieving answer phrases resulting from such search; and
   d. modifying said answer phrases and providing output derived from said answer phrases in the form of one or more direct answers to said search question or query.

2. The method of claim 1, further comprising the step of:
   (i) prior to step b, extracting key words and/or phrases from said search question or query, generating a key words and/or phrases search comprising said key words and/or phrases, and inputting said key words and/or phrases search to one or more search engines and/or search services.

3. The method of claim 1, further comprising the step of:
(i) prior to step a, receiving a natural language question, and converting said natural language question to said search question or query in the form of an expected answer form.

4. The method of claim 3, step (i) further comprising converting said natural language question to a generic question form, and converting said generic question form to said search question or query.

5. The method of claim 4, wherein said natural language question comprises generic question terms and substantive data terms, and said step of converting said natural language question to a generic question form further comprises replacing said substantive data terms with substantive data variable phrases.

6. The method of claim 5, wherein said step of converting said generic question form to said search question or query further comprises parsing said generic question form directly into an expected answer form having substantive data variable phrases, and substituting substantive data terms from said natural language question for substantive data variable phrases in said expected answer forms.

7. The method of claim 5, wherein said step of converting said generic question form to said search question or query further comprises comparing said generic question form to a listing of stored generic question forms having expected answer forms associated therewith, identifying a stored generic question form in said listing that matches said generic question form, retrieving expected answer forms associated with said identified generic question form and having substantive data variable phrases, and substituting substantive data terms from said natural language question for substantive data variable phrases in said expected answer forms.

8. The method of claim 7, said expected answer forms further comprising answer variable phrases representative of answer data to be retrieved, step c further comprising locating natural language phrases in said first data set containing said substantive data terms, and containing answer data arranged in said natural language phrases with respect to said substantive data terms so as to syntactically match said expected answer forms.

9. The method of claim 5, further comprising the step of:
(ii) prior to step b, extracting key words and/or phrases from said search question or query, generating a key words and/or phrases search comprising said key words and/or phrases, and inputting said key words and/or phrases search to one or more search engines and/or search services.

10. The method of claim 9, wherein said key words and/or phrases further comprise said substantive data terms in said natural language question.

11. The method of claim 1, step d further comprising highlighting a portion of said direct answers containing said data replacing said variable expression.

12. The method of claim 1, step d further comprising ranking said output based upon at least one of (i) redundant occurrence of an answer phrase, and (ii) length of said data replacing said variable expression.

13. A method for producing answers to a question or query, executable in a computer system, comprising the steps of:
a. receiving a search question or query comprising data indicative of a subject to be searched;
b. initiating a key words and/or phrases search of an information repository for data containing terms present in said search question or query, and receiving a first data set comprising data from said information repository containing terms present in said search question or query;
c. retrieving answer phrases from said first data set having a syntactic form matching an expected answer to said search question or query; and
d. providing output in the form of one or more of said answer phrases.

14. The method of claim 13, further comprising the step of:
(i) prior to step b, constructing a new search query comprising key words and/or phrases including said data indicative of a subject to be searched, said new search query configured as input to an information retrieval engine executable in a computer system.

15. The method of claim 13, further comprising the step of:
(i) prior to step b, extracting key words and/or phrases from said search question or query, generating a key words and/or phrases search comprising said key words and/or phrases, and inputting said key words and/or phrases search to a search engine.

16. The method of claim 13, further comprising the step of:
(i) prior to step a, receiving a natural language question, and converting said natural language question to said search question or query in the form of an expected answer form.

17. The method of claim 16, further comprising converting said natural language question to a generic question form, and converting said generic question form to said search question or query.

18. The method of claim 17, wherein said natural language question comprises generic question terms and substantive data terms, and said step of converting said natural language question to a generic question form further comprises replacing said substantive data terms with substantive data variable phrases.

19. The method of claim 18, wherein said step of converting said generic question form to said search question or query further comprises parsing said generic question form directly into an expected answer form having substantive data variable phrases, and substituting substantive data terms from said natural language question for substantive data variable phrases in said expected answer forms.

20. The method of claim 18, wherein said step of converting said generic question form to said search question or query further comprises comparing said generic question form to a listing of stored generic question forms having expected answer forms associated therewith, identifying a stored generic question form in said listing that matches said generic question form, retrieving expected answer forms associated with said identified generic question form and having substantive data variable phrases, and substituting substantive data terms from said natural language question for substantive data variable phrases in said expected answer forms.

21. The method of claim 20, said expected answer forms further comprising answer variable phrases representative of answer data to be retrieved, step c further comprising locating natural language phrases in said first data set containing said substantive data terms, and containing answer data arranged in said natural language phrases with respect to said substantive data terms so as to syntactically match said expected answer forms.

22. The method of claim 18, further comprising the step of:
  (ii) prior to step b, extracting key words and/or phrases from said search question or query, generating a key words and/or phrases search comprising said key words and/or phrases, and inputting said key words and/or phrases search to one or more search engines and/or search services.

23. The method of claim 22, wherein said key words and/or phrases further comprise said substantive data terms in said natural language question.

24. The method of claim 13, step d further comprising modifying said answer phrases and providing output derived from and including said answer phrases, said output being in the form of one or more direct answers to said search question or query.

25. A method for processing a natural language question or query, executable in a computer system, comprising the steps of:
  a. receiving a natural language question or query comprising generic question terms and substantive data terms;
  b. converting said natural language question or query to a generic question form;
  c. converting said generic question form to an expected answer form;
  d. initiating a key words and/or phrases search of an information repository containing natural language data for information containing key words and/or phrases present in said key words and/or phrases search, and receiving a results set comprising information containing key words and/or phrases present in said key words and/or phrases search;
  e. filtering said results set to retrieve answer phrases syntactically matching said expected answer form; and
  f. formatting said answer phrases as direct answers to said natural language question or query, and producing output in the form of formatted answer phrases.

26. The method of claim 25, step b further comprising replacing said substantive data terms in said natural language question or query with substantive data variable phrases.

27. The method of claim 26, step c further comprising parsing said generic question form directly into an expected answer form having substantive data variable phrases, and substituting substantive data terms from said natural language question for substantive data variable phrases in said expected answer forms.

28. The method of claim 26, step c further comprising comparing said generic question form to a listing of stored generic question forms having expected answer forms associated therewith, identifying a stored generic question form in said listing that matches said generic question form, retrieving expected answer forms associated with said identified generic question form and having said substantive data variable phrases, and substituting substantive data terms from said natural language question or query for substantive data variable phrases in said expected answer forms.

29. The method of claim 28, step d further comprising, prior to initiating said key words and/or phrases search, extracting said substantive data terms from said expected answer forms and generating a key words and/or phrases search query comprising the extracted substantive data terms.

30. The method of claim 28, step e further comprising locating natural language phrases in said results set containing said substantive data terms, and containing answer data arranged in said natural language phrases with respect to said substantive data terms so as to syntactically match said expected answer form.

31. The method of claim 25, step f further comprising modifying said answer phrases to provide output derived from and including said answer phrases, said output being in the form of one or more direct answers to said natural language question or query.

32. A system for producing answers to a question or query comprising:
  a server computer hosting a data search service accessible via client computers to a plurality of potential users, said server computer having computer readable program code means embodied therein and means for communicating with an information repository containing natural language data, said computer readable program code means further comprising:
  a. program code means for converting a natural language question or query comprising generic question terms and substantive data terms into an expected answer form comprising said substantive data terms and answer variable phrases;
  b. program code means for extracting said substantive data terms from said expected answer form, generating a key words and/or phrases search query comprising the extracted substantive data terms, and initiating a key words and/or phrases search of said information repository using said key words and/or phrases search query;
  c. program code means for filtering results of said key words and/or phrases search to retrieve answer phrases syntactically matching said expected answer form; and
  d. program code means for formatting said answer phrases as direct answers to said natural language question or query, and for producing output in the form of formatted answer phrases.

* * * * *